(No Model.)  3 Sheets—Sheet 1.
M. L. NICHOLS.
REEL FOR HARVESTING MACHINES.
No. 414,160.  Patented Oct. 29, 1889.
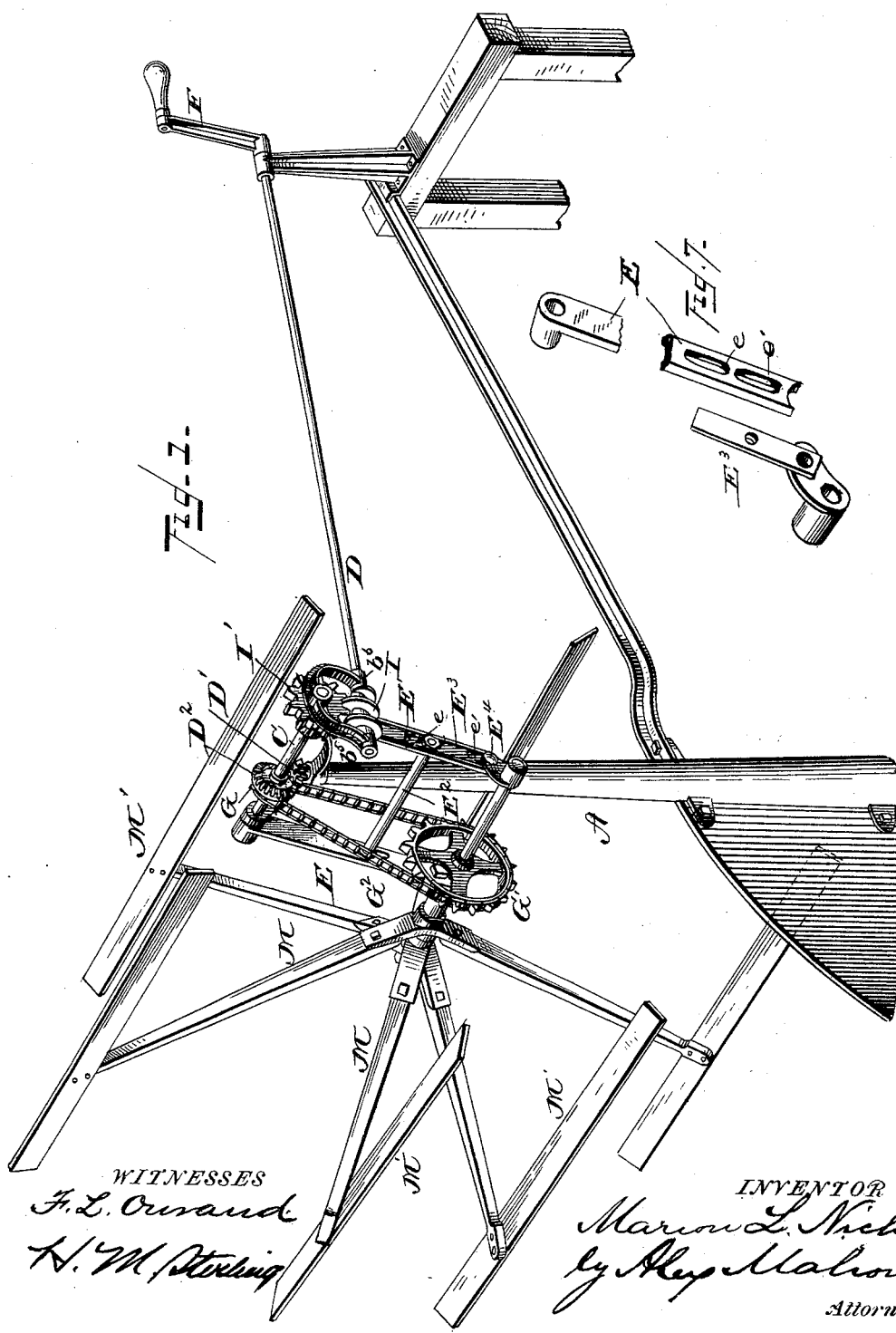
WITNESSES
F. L. Onvand
H. M. Sterling
INVENTOR
Marion L. Nichols
by Alex Mahon
Attorney

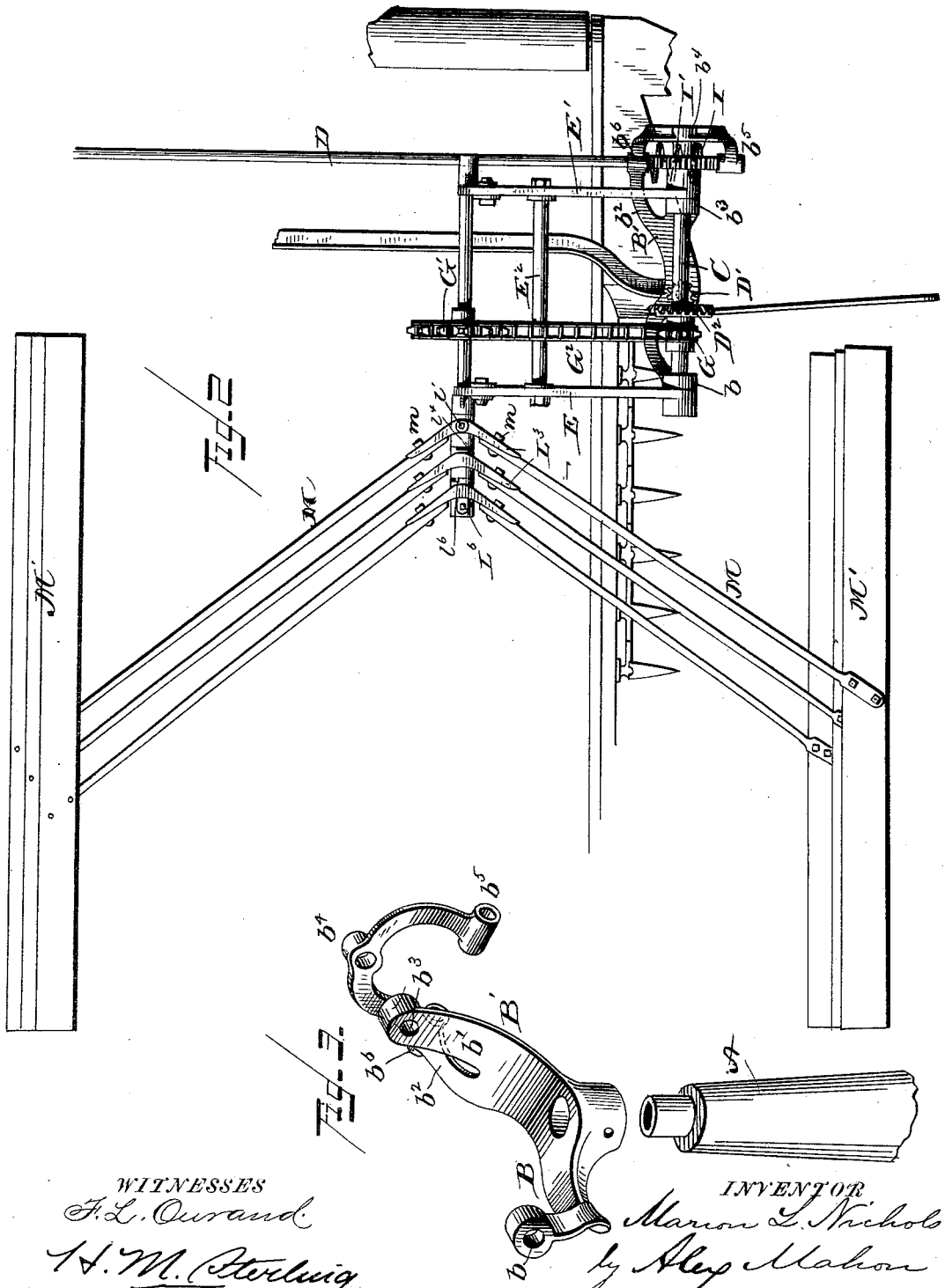

(No Model.) 3 Sheets—Sheet 3.

M. L. NICHOLS.
REEL FOR HARVESTING MACHINES.

No. 414,160. Patented Oct. 29, 1889.

WITNESSES
F. L. Ourand
H. M. Stirling

INVENTOR
Marion L. Nichols
by Alex Mahon
Attorney

UNITED STATES PATENT OFFICE.

MARION L. NICHOLS, OF NEW YORK, N. Y.

REEL FOR HARVESTING-MACHINES.

SPECIFICATION forming part of Letters Patent No. 414,160, dated October 29, 1889.

Application filed February 7, 1889. Serial No. 299,054. (No model.)

*To all whom it may concern:*

Be it known that I, MARION L. NICHOLS, of New York, county of New York, State of New York, have invented new and useful Improvements in Reels for Harvesting - Machines, of which the following is a full and exact description, reference being had to the accompanying drawings, making part of this specification.

My invention relates to a novel means for controlling and supporting the reels of harvesting-machines, and also to the manner of folding the same when not in use.

The invention consists in a novel construction of reel-post head having brackets or bearings for the driving and supporting mechanism and the operating or adjusting devices connected therewith.

It further consists in a novel construction of reel-heads and to the manner of mounting the same upon their shaft, whereby the blades may be folded together in compact form for shipment or storage, all as hereinafter described.

Figure 4:
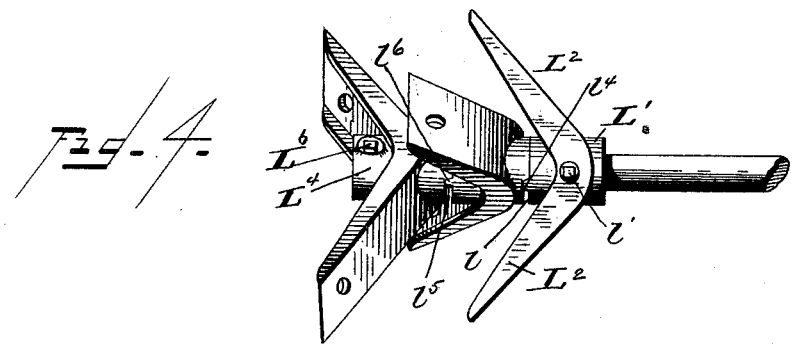
Figure 5:
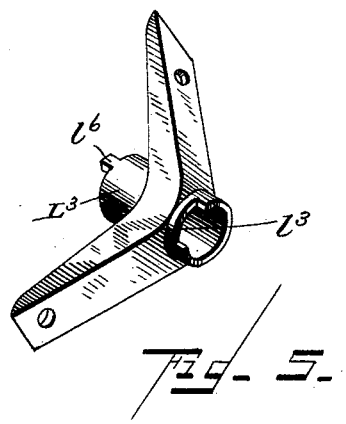
Figure 6:
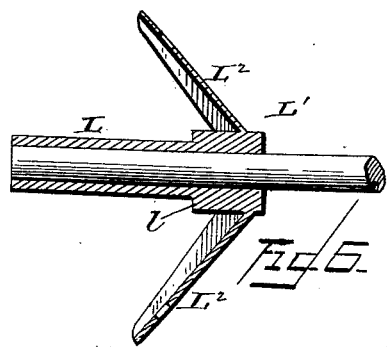

In the accompanying drawings, Figure 1 is a perspective view of a reel-post, showing the reel-supporting frame and reel mounted thereon, also a portion of the rear upright timbers of a harvester-frame with the rod and lever or crank for adjusting the reel, and showing the reel extended. Fig. 2 is a side elevation of the same, showing the reel folded and carried or thrown back over the canvas. Fig. 3 is a perspective view of the reel-supporting head, in which the several bearings for the reel supporting and adjusting devices are mounted. Fig. 4 is a side elevation of a portion of the reel-shaft, showing the reel-heads. Fig. 5 is a perspective view of one of the reel-heads, showing the notched sleeve and projecting lug thereon, by which their relation is maintained to each other. Fig. 6 is a section through the hollow sleeved shaft carrying one set of socketed arms and upon which the hubs or heads are mounted. Fig. 7 is a perspective view of one of the arms with its extension in which the reel is mounted.

The reel-post A is made in hollow cylindrical form and is mounted on the frame of the harvester in any manner or preferred way. The reel-post tapers from its base to apex, and has mounted on its end a head for supporting the reel driving, supporting, and regulating mechanism. The head consists of a sleeve having two outwardly-extending arms B B', the one B extending outward from the post over the cutting apparatus and is curved rearward and then forward and upward, as shown, and at the top is provided with a bearing $b$ for one end of the reel supporting and adjusting shaft C, hereinafter referred to. The other arm B' extends out from the opposite side of the reel-post and into two arms or branches $b'$ $b^2$, in one of which arms $b'$ is formed the other bearing $b^3$ for the supporting-shaft C, while the other arm $b^2$ curves upward and outward behind the arm $b'$ and has an additional bearing $b^4$ formed therein for the supporting-shaft. An extension of this arm $b^2$ extends downward from the bearing $b^4$, and at its end is provided with a bearing $b^5$ for the rod or shaft D, by which the reel is adjusted. A second bearing $b^6$ for said rod is formed in the portion of the arm $b^2$ in line with the bearing $b^5$.

In the hollow reel-post is mounted the reel-driving shaft, driven from any desired mechanism connected with the driving mechanism of the machine, and on the upper end of which shaft is secured a bevel-pinion D', which engages and drives a bevel-pinion D², mounted loosely on the reel supporting and adjusting shaft C. On the ends of the shaft C are mounted and rigidly secured arms E E', the one E being located at one end, while the hub of the other is located on the shaft between the bearings $b^3$ and $b^4$. The arms E E' near their outer ends are connected by means of a rod or bolt E², which passes through elongated slots $e$, formed in said arms. The arms E E' are provided with extensions E³, connected thereto through the rod or bolt E² and short bolts E⁴, and in the outer ends of which extensions are formed the bearings for the reel-shaft, the relation of the reel-shaft to its supporting-shaft and driving mechanism being adjusted and regulated by means of the slots $e$ and $e'$, connecting-rod E², and short bolts E⁴, passing through the arms E E' and the arm-extensions E³.

On the hub of the bevel-pinion D² is formed or connected a sprocket-wheel G, and mounted on the reel-shaft in line therewith is a sprocket-wheel G', and through which said reel-shaft is revolved by a sprocket-chain G².

The means for controlling the reel and adjusting its relation to the grain is as follows: The bearings $b^5$ $b^6$ for the rod or shaft D adjacent to the reel are, as before stated, formed with the reel-supporting head, the opposite end being mounted in bearings on the rear of the harvester-frame within convenient reach of the driver's seat, at which point it is provided with a crank or handle F, by which it is controlled. On the end of the rod or shaft D, and between the bearings $b^5$ $b^6$, is keyed a worm or screw I, which engages with and drives a worm gear or pinion I', formed with and rigidly secured to the hub of the arm E'. It will thus be seen that a fixed distance is maintained between the reel carrying and driving shafts under its various adjustments, and by the construction of reel driving, supporting, and actuating mechanism above described it will also be seen that the reel can be thrown outward and upward or downward and inward in relation to the cutters by turning the crank H, in a manner that will be readily understood.

The hubs to which the reel-arms M, which carry the blades or beaters M', are connected are constructed in the following manner: A hollow sleeve-shaft L has formed at one end an enlarged head L', forming a shoulder $l$, hereinafter referred to, and from this enlarged head L' extend arms or socketed plates $L^2$, extending therefrom at any desired angle, and in which socketed plates or arms are mounted the reel-arms M, secured thereto by means of bolts $m$. This hollow sleeved shaft is secured to the reel-shaft by means of a set-screw $l'$. A second hub or head $L^3$, provided with similar socketed arms or plates, is mounted on the hollow sleeve-shaft L, the face of which rests against the shoulder $l$ on the head L'. The hub $L^3$ is notched or cut away, as shown at $l^3$, and on the shoulder $l$ is formed the lug $l^4$, to engage said notch or cut-away portion, and by means of which notch and lug the relation of the arms or plates $L^2$ to each other is regulated. A third hub or head $L^4$, constructed at one end in a similar manner to the hub $L^3$, is also mounted on the hollow sleeve-shaft L, and is provided with a similar notch or cut-away portion $l^5$, to be engaged by a lug $l^6$ on the face of the hub $L^3$, for controlling the relation of the head $L^4$ to the heads L' $L^3$. A set-screw $L^6$, passing through a screw-threaded perforation in the head $L^4$ and engaging the shaft L, serves to hold said head, and with it the heads L' $L^3$, through the notches and lugs formed thereon, in any desired position in relation to each other. The notches are of such length and the lugs are formed on the hubs in such relation to the notches that the arms on the heads may be either brought into line with each other to fold the reel up when not in use or for transportation, or turned so as to have a spiral relation to each other when the beaters or blades are to be extended into their operative position, in a manner and for a purpose that will be readily understood.

When the machine is not in use and the arms of the hubs are brought into line, the frame carrying the same may be thrown back or to the opposite side of the reel-post, or in rear of the cutters, and the reel-arms and beaters will be carried back over the canvas and out of the way, which permits the machine to be stored or housed in a small space without detaching the parts, and also facilitates the shipment of the machine.

Having now described my invention, I claim—

1. In a harvester, the combination of the reel-post and the head mounted thereon, provided with bearings for the supporting and adjusting shaft, and also for the shaft carrying the adjusting mechanism for the gear, formed in one piece, substantially as described.

2. In a harvester, the combination of the reel-post head, the reel-supporting shaft journaled in the head and having the reel-supporting frame secured thereto, the reel-adjusting wheel rigidly secured to the frame, the bevel-pinion mounted loosely on the shaft, the sprocket-wheel secured to said pinion, the reel-shaft journaled in said frame, the sprocket-wheel mounted thereon, and the pinion mounted on the driving-shaft in the reel-post engaging the pinion on the supporting-shaft, substantially as described.

3. In a harvester, the reel-spider composed of a series of separate heads provided with two arms located in line with each other, and a separate beater connected with each of said arms, and devices, substantially as described, for holding the several heads either in line or at angles to each other, as set forth.

4. In a harvester, the reel-spider composed of the hollow sleeved shaft mounted on the reel-shaft and provided with arms or plates, and the heads mounted on said sleeved shaft, also provided with arms or plates, devices for connecting the hollow sleeved shaft to the reel-shaft, and means for holding the end head engaged with the hollow sleeve and all the heads in a fixed relation to each other, substantially as described.

5. In a harvester, the hollow sleeved shaft mounted on the reel-shaft, having two of the reel-supporting plates or sockets formed therewith, the hubs mounted on the sleeved shaft and provided with the other plates or sockets, said hubs provided with notches and lugs to engage each other, and the set-screws for securing the sleeved shaft to the reel-shaft and the hubs in relation to each other, as set forth.

In testimony whereof I have hereunto set my hand this 31st day of December, A. D. 1888.

MARION L. NICHOLS.

Witnesses:
ALEX. MAHON,
F. L. OURAND.